US010494541B2

(12) United States Patent
Steiner et al.

(10) Patent No.: US 10,494,541 B2
(45) Date of Patent: Dec. 3, 2019

(54) AQUEOUS DISPERSIONS

(71) Applicant: Allnex Austria GmbH, Werndorf (AT)

(72) Inventors: Andreas Steiner, Graz (AT); Florian Lunzer, Graz (AT); Michaela Zirngast, Grossklein (AT); Claudia Pietsch, Graz (AT); Johann Billiani, Graz (AT); Michael Gobec, Graz (AT); Wolfgang Hyden, Voitsberg (AT)

(73) Assignee: ALLNEX AUSTRIA GMBH, Werndorf (AT)

( * ) Notice: Subject to any disclaimer, the term of this patent is extended or adjusted under 35 U.S.C. 154(b) by 0 days.

(21) Appl. No.: 15/569,462

(22) PCT Filed: Apr. 7, 2016

(86) PCT No.: PCT/EP2016/057644
§ 371 (c)(1),
(2) Date: Oct. 26, 2017

(87) PCT Pub. No.: WO2016/173821
PCT Pub. Date: Nov. 3, 2016

(65) Prior Publication Data
US 2018/0086936 A1  Mar. 29, 2018

(30) Foreign Application Priority Data

Apr. 27, 2015 (EP) .................... 15165241

(51) Int. Cl.
| | |
|---|---|
| C09D 151/06 | (2006.01) |
| C09D 15/00 | (2006.01) |
| C09D 151/00 | (2006.01) |
| C08F 220/64 | (2006.01) |
| C08F 220/58 | (2006.01) |
| C08F 267/06 | (2006.01) |
| C08F 220/14 | (2006.01) |
| C08F 2/22 | (2006.01) |
| C08F 285/00 | (2006.01) |
| C08F 220/18 | (2006.01) |
| C08F 212/08 | (2006.01) |
| C08F 220/06 | (2006.01) |
| C08F 257/02 | (2006.01) |
| C08F 267/02 | (2006.01) |
| C08L 51/00 | (2006.01) |
| C08L 51/06 | (2006.01) |

(52) U.S. Cl.
CPC ............ *C09D 151/06* (2013.01); *C08F 2/22* (2013.01); *C08F 212/08* (2013.01); *C08F 220/06* (2013.01); *C08F 220/14* (2013.01); *C08F 220/18* (2013.01); *C08F 220/58* (2013.01); *C08F 220/64* (2013.01); *C08F 257/02* (2013.01); *C08F 267/02* (2013.01); *C08F 267/06* (2013.01); *C08F 285/00* (2013.01); *C08L 51/003* (2013.01); *C08L 51/06* (2013.01); *C09D 15/00* (2013.01); *C09D 151/003* (2013.01); *C08F 2220/1825* (2013.01); *C08F 2220/1858* (2013.01); *C08F 2220/1875* (2013.01); *C08F 2800/20* (2013.01); *C08L 2201/50* (2013.01)

(58) Field of Classification Search
CPC .. C09D 15/00; C09D 151/003; C09D 151/06; C08L 51/003; C08L 51/06; C08L 2201/50; C08F 220/06; C08F 267/02; C08F 257/02; C08F 212/08; C08F 2/22; C08F 267/06; C08F 285/00; C08F 220/18; C08F 220/14; C08F 2800/20; C08F 2220/1858; C08F 2220/1825; C08F 220/64; C08F 2220/1875; C08F 220/58
USPC ........................................................ 524/460
See application file for complete search history.

(56) References Cited

U.S. PATENT DOCUMENTS

| | | | |
|---|---|---|---|
| 4,073,758 | A | 2/1978 | Nakayama et al. |
| 4,122,052 | A | 10/1978 | Aihara et al. |
| 5,434,215 | A | 7/1995 | Sankaran et al. |
| 5,589,535 | A | 12/1996 | Schwab et al. |

(Continued)

FOREIGN PATENT DOCUMENTS

| | | |
|---|---|---|
| EP | 0 267 562 | 11/1987 |
| EP | 0 444 454 | 2/1991 |

(Continued)

OTHER PUBLICATIONS

English language machine translation of WO/1992/014763 (Year: 1992).*

(Continued)

*Primary Examiner* — Angela C Scott
(74) *Attorney, Agent, or Firm* — Wenderoth, Lind & Ponack, L.L.P.

(57) ABSTRACT

The present invention relates to an aqueous dispersion obtained by a process comprising the steps of (a) preparing an acidic copolymer (A) by radical copolymerization of monomers comprising: (a1) at least one unsaturated fatty acid, (a2) at least one ethylenically unsaturated monomer containing at least one acid group or group capable of forming an acid group, (a3) at least one other ethylenically unsaturated monomer different from (a1) and (a2), (b) neutralizing totally or partially the acid groups of copolymer (A) and dissolving it in water, (c) copolymerizing in the solution obtained at step (b) a monomer mixture different from the monomer mixture of step (a) to form a copolymer (B) as well as blends based on such dispersions, especially in combination with oxidatively drying alkyds.

19 Claims, No Drawings

(56) References Cited

U.S. PATENT DOCUMENTS

| | | |
|---|---|---|
| 5,698,625 A | 12/1997 | Billiani et al. |
| 6,489,398 B1 | 12/2002 | Zückert et al. |
| 9,133,364 B2 | 9/2015 | Reidlinger et al. |
| 2010/0261840 A1 | 10/2010 | Breiner et al. |

FOREIGN PATENT DOCUMENTS

| | | |
|---|---|---|
| EP | 0 305 795 | 10/1995 |
| WO | 92/14763 | 9/1992 |
| WO | 2010/051346 | 6/2010 |
| WO | 2012/013611 | 2/2012 |

OTHER PUBLICATIONS

International Search Report dated Jun. 20, 2016 in International Application No. PCT/EP2016/057644.
Written Opinion of the International Searching Authority dated Jun. 20, 2016 in International Application No. PCT/EP2016/057644.

* cited by examiner

AQUEOUS DISPERSIONS

The present invention relates to new aqueous dispersions of acrylic-fatty acid hybrid systems, to their preparation and uses.

The aqueous dispersion compositions according to the present are suitable as coating agents or binder agents for decorative and protective coating applications on various substrates.

In many architectural applications (e.g.: wood coatings (deck stain, trim), metal coatings, . . . ) waterborne acrylic or styrene-acrylic resins are used because of their high chemical stability, good weatherability and water resistance, low VOC and easy synthesis via free radical emulsion polymerization.

On the other hand, unsaturated fatty acid based alkyd resins are also very often used in the same applications due to their high gloss and good substrate and pigment wetting properties, although their chemical resistance and weatherability typically are weaker than the corresponding properties of acrylic resin types. In addition, the incorporation of drying fatty acids or drying vegetable oils into the alkyd resin enables oxidative drying and post-crosslinking of the obtained resins after film formation.

Hybrid systems based on fatty acid or fatty acid derivatives and acrylic or styrene-acrylic resins have already been disclosed in the prior art. These systems will be called acrylic-fatty acid systems for the sake of conciseness.

In U.S. Pat. Nos. 4,073,758, 4,122,052, WO 92/14763 and US 2010/0261840, unsaturated fatty acids or alcohols are grafted as side groups on copolymers by esterification reaction on glycidyl, carboxylic acid or alcohol co-reactive groups present on the copolymer backbone. These copolymers may subsequently be used as emulsifiers for the emulsion polymerization of vinyl monomers.

In EP 0305795, a resin (B) is used as emulsifier in the copolymerization of vinyl monomers. The resin (B) is a polymeric emulsifier consisting of a copolymer backbone containing a grafted alkyd resin.

U.S. Pat. No. 5,434,215 relates to an aqueous polymeric dispersion incorporating a wax. The emulsion polymerization of the monomers is performed in the presence of the wax, which is not covalently bound to the polymeric backbone The hybrid systems of the art lack chemical stability mainly because the fatty acid moieties are not bound into the polymer backbone or are sensitive to hydrolysis. Those systems do not present a good water resistance and good weatherability.

It is hence an object of the present invention to develop new aqueous dispersions of acrylic-fatty acid hybrid systems that overcome the above drawbacks.

Therefore, the present invention relates to an aqueous dispersion obtained by a process comprising the steps of:
(a) preparing an acidic copolymer (A) having an acid value when contacted with water of at least 140 mg KOH/g by radical copolymerization of monomers comprising:
 (a1) at least one unsaturated fatty acid,
 (a2) at least one ethylenically unsaturated monomer containing at least one acid group or group capable of forming an acid group when contacted with water,
 (a3) at least one other ethylenically unsaturated monomer different from (a1) and (a2),
(b) neutralizing totally or partially the acid groups of copolymer (A) and dissolving it in water to form a totally or partially neutralized copolymer (A),
(c) copolymerizing in the solution obtained at step (b) at least one monomer mixture different from the monomer mixture of step (a) to form a copolymer (B).

The present invention further relates to a process to prepare an aqueous dispersion composition comprising the steps of:
(a) preparing an acidic copolymer (A) having an acid value when contacted with water of at least 140 mg KOH/g by radical copolymerization of monomers comprising:
 (a1) at least one unsaturated fatty acid,
 (a2) at least one ethylenically unsaturated monomer containing at least one acid group or group capable of forming an acid group when contacted with water,
 (a3) at least one other ethylenically unsaturated monomer different from (a1) and (a2),
(b) neutralizing totally or partially the acid groups of copolymer (A) and dissolving it in water to form a totally or partially neutralized copolymer (A),
(c) copolymerizing in the solution obtained at step (b) at least one monomer mixture different from the monomer mixture of step (a) to form a copolymer (B).

The unsaturated fatty acid (a1) is incorporated in the acidic copolymer (A) via carbon-carbon bonds.

By "aqueous dispersion" is here meant polymer particles dispersed in a continuous aqueous medium.

By "ethylenically unsaturated monomer" is meant in the present invention a monomer having at least one carbon-carbon double bond which can undergo radical polymerization.

The prefix "(meth)acryl" when used to name compounds of the present invention encompasses both "acryl" and "methacryl" and refers to compounds comprising at least one $CH_2=CHCOO-$ group or $CH_2=CCH_3COO-$ group, as well as mixtures thereof and mixtures of such compounds.

By "acrylic-fatty acid hybrid system" is meant a hybrid system based on fatty acid or fatty acid derivatives and (meth)acrylic or (meth)acrylic and styrenic derivatives.

The copolymer (A) prepared at step (a) may be a random, alternating or block copolymer. It is preferably a random copolymer.

The copolymerization in step (a) takes place by radical copolymerization. This may take place in a manner known to the skilled person by conventional methods, particularly by radical polymerization using thermal radical initiators. Examples of suitable thermal radical initiators include peroxides, such as benzoyl peroxide or di-tert-butyl peroxide, azo compounds, such as azo-bis-isobutyronitrile, and the like. The initiators may be used, for example, in amounts from 0.01 to 5.0 wt % of the starting monomers, preferably from 2.0 to 5.0 wt %.

To achieve a good control of the molecular weight and its distribution, a chain transfer agent, preferably of the mercaptan type, such as n-dodecylmercaptan, tert-dodecanethiol, iso-octylmercaptan, n-octylmercaptan, n-butyl-3-mercapto propionate or of the carbon halide type, such as carbon tetrabromide, bromotrichloromethane, can also be added in the course of the reaction. The chain transfer agent is generally used in amounts up to 5 wt % of the monomers used in the copolymerization of step (a).

The copolymerization of step (a) is generally carried out at a temperature from 60 to 180° C., preferably under an inert gas atmosphere. An organic solvent may be used. However the copolymerization of step (a) generally takes place in the absence of substantial amounts of organic solvent, usually less than 1 wt % of solvent relative to the total amount of reagents, preferably less than 0.2 wt %. In the case a solvent is used at step (a), it is removed in vacuum after completion of the reaction.

The copolymerization is generally performed until the conversion of monomers is at least 97%, quantified by the reaction product solid content according to DIN EN ISO 3251.

The monomer mixture used in step (a) typically comprises monomers (a1), (a2) and (a3).

The unsaturated fatty acid (a1) is a hydrocarbon compound comprising at least one carboxylic acid group and an aliphatic chain of at least 6 carbon atoms, comprising at least one carbon-carbon double bond. The aliphatic chain preferably has at least 8 carbon atoms and not more than 40 carbon atoms. The unsaturated fatty acid (a1) is generally an unsaturated aliphatic monocarboxylic acid derived from an animal or vegetable fat, oil or wax.

Suitable unsaturated fatty acids (a1) include tall oil fatty acids, suberin fatty acids, cutin fatty acids, plant oil fatty acids and their mixtures in general. Preferred unsaturated fatty acids (a1) to be used in the present invention alone or in mixture include tall oil fatty acids, suberin fatty acids, linseed oil fatty acids, soybean oil fatty acids, rapeseed oil fatty acids, rape oil fatty acids, sunflower oil fatty acids, olive oil fatty acids, castor oil fatty acids, safflower oil fatty acids, hemp seed oil fatty acids, walnut oil fatty acids, poppy seed oil fatty acids, corn oil fatty acids, cotton seed oil fatty acids, mustard oil fatty acids, oiticica oil fatty acids, peanut oil fatty acids, perilla oil fatty acids, rubber-seed oil fatty acids, sesame oil fatty acids, tung oil fatty acids and the like, which contain a significant amount of conjugated or non-conjugated double bonds. Preferred unsaturated fatty acids (a1) have an iodine number of at least 50 as measured according to DIN 53241 T 1, more preferred fatty acids have an iodine number of at least 100. Most preferred are soybean oil fatty acids, linseed oil fatty acids, tall oil fatty acids and mixtures thereof. They are used alone or in mixture with others as unsaturated fatty acids (a1) as described here above.

The ethylenically unsaturated monomer (a2) suitable in the present invention is a compound comprising at least one acid group or group capable of forming an acid group when contacted with water and at least one ethylenically unsaturated group. By group capable of forming an acid group is meant any group such as anhydrides and esters able to lead to the formation of an acid group when contacted with water in suitable conditions. Esters able to lead to the formation of an acid group when contacted with water are typically activated esters such as —C(=O)—O—R, wherein R is an electron-withdrawing activating group such as N-hydroxysuccinimide or the like. Those groups can be converted into acid groups by conventional methods known to the skilled person. When present, these groups are converted in acid groups at the end of step (a) or during step (b).

Suitable monomers (a2) include (meth)acrylic acid, β-carboxyethyl(meth)acrylate, crotonic acid, maleic acid, fumaric acid, itaconic acid, mesaconic acid, methylenemalonic acid, citraconic acid and their anhydrides, 4-methacryloyloxyethyl trimellitate anhydride, (meth)acrylic acid N-hydroxysuccinimide ester, 2-(meth)acrylamido-2-methylpropanesulfonic acid, (meth)acrylamidosulfonic acid, vinylsulfonic acid, allylsulfonic acid, vinylphosponic acid, allylphosphonic acid and mixtures thereof. The monomer (a2) is preferably (meth)acrylic acid, crotonic acid or mixtures thereof, more preferably (meth)acrylic acid, most preferably acrylic acid.

The ethylenically unsaturated monomer (a3) can be any ethylenically unsaturated compound polymerizable by radical polymerization known to the skilled person that is different from (a1) and (a2).

Examples of such monomers include styrenic derivatives such as styrene, vinyltoluene, alpha-methylstyrene, ethylstyrene, isopropylstyrene, tert-butylstyrene, 2,4-dimethylstyrene, diethylstyrene, o-methyl-isopropylstyrene, chlorostyrene, fluorostyrene, iodostyrene, bromostyrene, 2,4-cyanostyrene, hydroxystyrene, nitrostyrene, phenylstyrene.

Monomers (a3) can be selected from esters of (meth) acrylic and crotonic acid with saturated linear or cyclic alcohols containing 1 to 20, more preferably from 1 to 14, carbons on the alkyl or cyclic group. Examples include but are not limited to alkyl(meth)acrylates such as methyl (meth)acrylate, ethyl (meth)acrylate, propyl (meth)acrylate, butyl (meth)acrylate, pentyl (meth)acrylate, hexyl (meth) acrylate, heptyl (meth)acrylate, octyl (meth)acrylate, nonyl (meth)acrylate, decyl (meth)acrylate, undecyl (meth)acrylate, dodecyl (meth)acrylate, tridecyl (meth)acrylate, tetradecyl (meth)acrylate and isobornyl (meth)acrylate. Monomers (a3) can also be selected of heterocyclic (meth) acrylates like for instance tetrahydrofurfuryl (meth)acrylate. Monomers (a3) can also be selected from functionalized (meth)acrylates such as epoxy-functional (meth)acrylates, especially glycidyl (meth)acrylate, and hydroxyl-functionalized (meth)acrylates, such as hydroxyalkyl (meth)acrylates. Some non limiting examples are hydroxymethyl (meth)acrylate, hydroxyethyl (meth)acrylate, hydroxypropyl (meth)acrylate, hydroxybutyl (meth)acrylate, hydroxypentyl(meth)acrylate, hydroxyhexyl (meth)acrylate hydroxyheptyl (meth)acrylate, hydroxyoctyl (meth)acrylate, hydroxynonyl (meth)acrylate, hydroxydecyl (meth)acrylate, hydroxyundecyl (meth)acrylate, hydroxydodecyl (meth) acrylate, hydroxytridecyl (meth)acrylate, hydroxytetradecyl (meth)acrylate.

Further usable functionalized monomers (a3) include (meth)acrylamide, vinyl acetate, (meth)acrylonitrile, N-vinylformamide, N-vinylpyrrolidone, N-butoxymethyl (meth) acrylamide, N-methylol (meth)acrylamide and monomers that contain besides a polymerizable group such as a vinyl, (meth)acrylamide or (meth)acryl group also a keto group, such as diacetone (meth)acrylamide; an aceto acetoxy group, such as acetoacetoxyethyl (meth)acrylate or an ureido group (also called a 2-Oxo-1-imidazolidinyl group), such as N-(2-(meth)acryloyloxyethyl)-ethylene urea (also called 2-(2-Oxo-1-imidazolidinyl)ethyl (meth)acrylate) or ureido (meth)acrylate).

Mixtures of any of the listed monomers can also be used.

Preferred monomers (a3) used in the present invention are styrene, vinyltoluene, alpha-methylstyrene, ethylstyrene, (meth)acrylamide, diacetone (meth)acrylamide, isobornyl (meth)acrylate, methyl (meth)acrylate, ethyl (meth)acrylate, propyl (meth)acrylate, butyl (meth)acrylate, pentyl (meth) acrylate, hexyl (meth)acrylate, heptyl (meth)acrylate, octyl (meth)acrylate, vinyl acetate, ureido(meth)acrylate and mixtures thereof.

Most preferred monomers (a3) used in step (a) of the present invention are styrene, alpha-methylstyrene, (meth) acrylamide, diacetone (meth)acrylamide, isobornyl (meth) acrylate, methyl (meth)acrylate, and mixtures thereof.

More preferably, monomers (a3) used in step (a) of the present invention are those having a glass transition temperature (Tg) of their homopolymerisate of at least, more preferably higher than, 50° C. such as styrene, alpha-methylstyrene, (meth)acrylamide, diacetone (meth)acrylamide, isobornyl (meth)acrylate, methyl methacrylate, and mixtures thereof.

The copolymer (A) is typically obtained from:

5 to 50 wt % of unsaturated fatty acid (a1),
5 to 90 wt % of ethylenically unsaturated monomer (a2),
5 to 80 wt % of ethylenically unsaturated monomer (a3), based on the sum of (a1), (a2) and (a3).

In an embodiment of the present invention, (a1), (a2) and (a3) sum up to 100 wt %.

The amount of the unsaturated fatty acid (a1) used in the preparation of copolymer (A) is preferably at least 10 wt %, more preferably at least 15 wt % and preferably it does not exceed 45 wt %, more preferably 40 wt %, most preferably 39 wt %.

The amount of the ethylenically unsaturated monomer (a2) used in the preparation of copolymer (A) is preferably at least 7 wt %, more preferably at least 10 wt % and preferably it does not exceed 80 wt %, more preferably 60 wt %.

The amount of the ethylenically unsaturated monomer (a3) used in the preparation of copolymer (A) is preferably at least 10 wt %, more preferably at least 15 wt % and preferably it does not exceed 75 wt %, more preferably 70 wt %.

The copolymer (A) obtained by step (a) of the present invention needs to have an acid value when contacted with water of at least 140 mg KOH/g, preferably of at least 150 mg KOH/g, more preferably at least 161 mg KOH/g and most preferably at least 170 mg KOH/g. Particularly preferred are copolymers (A) having an acid value of at least 180 mg KOH/g. The acid value typically does not exceed 400 mg KOH/g, preferably 300 mg KOH/g, more preferably 280 mg KOH/g, most preferably 270 mg KOH/g. The acid value is typically determined according to DIN EN ISO 2114. Monomer (a1) and monomer (a2) containing acid groups or groups capable of forming an acid group when contacted with water contribute to the acid value of copolymer (A).

Copolymer (A) has generally a weight average molecular weight of at least 2000 Da, preferably at least 3000 Da. The weight average molecular weight generally does not exceed 20000 Da, preferably 15000 Da as determined according to DIN 55672-1.

The glass transition temperature (Tg) of copolymer (A) is preferably at least 0° C., more preferably at least 35° C. as determined according to DIN EN 61006.

In step (b) of the present invention, the acid groups of copolymer (A) obtained at step (a) are totally or partially neutralized with a neutralizing agent and the copolymer is dissolved in water. By totally or partially neutralized is meant in the present invention that all or at least part of the acid groups present in the copolymer (A) are neutralized by a basic compound.

Examples of neutralizing agents useful to neutralize copolymer (A) are ammonia, amines and inorganic hydroxides. Inorganic hydroxides are for instance sodium or potassium hydroxide. Examples of suitable amines are primary, secondary, tertiary amines, cyclic amines and mixtures thereof. Examples of such amines are primary, secondary or tertiary alkylamines like methylamine, dimethylamine, trimethylamine, ethylamine, diethylamine, triethylamine, ethanolamine, diethanolamine, triethanolamine, cyclic amines like pyridine, piperidine, piperazine or the like. Preferred neutralizing agent is ammonia.

A solution of the at least partially neutralized copolymer (A), is generally prepared by mixing the copolymer (A) obtained at step (a) and a water/neutralizing agent solution at a temperature of at least 20° C., preferably at least 40° C., more preferably at least 50° C. The temperature generally does not exceed 90° C., preferably 85° C., more preferably 80° C.

The amount of copolymer (A) and the amount of water/neutralizing agent solution are typically chosen to yield a solution of the at least partially neutralized copolymer (A) in water of at least 5 weight %, preferably at least 15 weight % total and more preferably at least 20 weight %. The amount of copolymer (A) in the solution is determined according to DIN 55671.

The amount of neutralizing agent in the mixture is chosen to yield the desired degree of neutralization of the acid groups present in copolymer (A). The degree of neutralization is generally defined as the percentage of acid groups neutralized in copolymer (A). The degree of neutralization typically is at least 30%, preferably at least 60% and more preferably at least 70% based on the total number of acid groups present in copolymer (A) when contacted with water. The total number of acid groups refers to the acid groups originating from monomer (a1) and monomer (a2) containing acid groups or groups capable of forming an acid group when contacted with water.

The mixture of the at least partially neutralized copolymer (A) and water/neutralizing agent mixture is stirred until a homogeneous solution is obtained.

The solution obtained at step (b) has typically a pH of at least 7.0, preferably at least 7.3. The pH generally does not exceed 9.0, preferably 8.5.

At least a portion of the acid groups of copolymer (A) may be used in an esterification reaction with an alkyd resin to graft alkyd moieties on the copolymer backbone (A). However, preferably no alkyd moiety is grafted by esterification on the copolymer (A) of the present invention.

In step (c), a monomer mixture different from the monomer mixture of step (a) is copolymerized by emulsion copolymerization in the aqueous solution obtained at step (b) to form a copolymer (B).

Emulsion polymerization processes are known to the skilled person. They are usually distinguished by the fact that radical polymerization of ethylenically unsaturated monomers is carried out in the aqueous phase and in the presence of radical initiators and surfactants. The components mentioned can be introduced into the emulsion polymerization process in various ways.

When the partially or totally neutralized copolymer (A) of the invention is used in the emulsion polymerization, the good emulsifying power of this copolymer advantageously makes the presence of additional surfactants unnecessary. By "emulsifier" or "surfactant" is meant a compound that reduces interfacial tension between two liquids or a liquid and a solid. Emulsifiers or surfactants may be non-ionic such as alkyl or alkyl phenol ethoxylated derivatives, anionic such as salts of alkyl sulfates, phosphates or sulfonates or cationic such as quaternary ammonium salts of alkyl amines.

Usually, the major portion of the aqueous phase is introduced at the beginning and portions of water can be further added during the reaction under different ways such as in the form of a radical initiator solution or a monomer pre-emulsion.

The emulsion copolymerization step (c) of the present invention can be carried out over a broad temperature range. Typically, the partially or totally neutralized copolymer (A) solution obtained at step (b) is heated at a temperature ranging from 30 to 99° C.

A radical initiator is usually added to the solution in the pure form or in an aqueous solution at once, or continuously or incrementally over the reaction time.

Suitable initiators are typically water-soluble thermal radical-forming compounds like hydrogen peroxide, peracetic acid, perbenzoic acid and persulfates such as potassium peroxodisulfate or ammonium peroxodisulfate, perphosphates, peroxycarbonates, and hydroperoxides such as tert-butyl hydroperoxide. Other suitable initiators are redox systems. Examples of suitable redox systems are sodium persulfate/sodium formaldehyde sulfoxylate, cumene hydroperoxide/sodium metabisulphite, hydrogen peroxide/ascorbic acid, tert-butyl hydroperoxide/ascorbic acid and sulfur dioxide/ammonium persulfate. Also suitable are azo compounds such as 4,4'-azobis(cyanopentanoic acid) or 2,2'-azobis(isobutylonitrile). Other suitable initiators can also be used. The initiators are generally used in amounts between 0.01 and 5.0 wt % relative to the dispersion. The amount used is preferably from 0.01 to 2.0 wt %.

After addition of at least a portion of the radical initiator, the monomer mixture of step (c) can be introduced in pure form or as a pre-emulsion in water. Alternatively, the radical initiator can be added to the monomer mixture. An advantage of the process according to the present invention is that it enables a very easy and fast emulsion polymerization reaction, without the need of any pre-emulsion step for monomers, as it is the case in most other synthetic routes using additional surfactants. The monomer mixture of step (c) is hence preferably introduced in pure form. The mixture can be introduced in its entirety or continuously or incrementally during the emulsion polymerization. It is preferably introduced over a period of 1 to 8 hours, preferably over a period of 2 to 6 hours.

During the copolymerization, the reaction temperature usually ranges from 30 to 99° C. and can be maintained constant or can be varied during step (c).

In a particular embodiment of the invention, it is possible to add different monomers or monomer mixtures in sequences. Using this approach, the copolymer (B) can be designed to have multi-domain structures showing multiple Tg.

In a specific variant of this embodiment, at least two different monomer mixtures are added sequentially to prepare copolymer (B) and the obtained copolymer (B) has at least two Tg. For instance a copolymer (B) may be prepared with a first monomers mixture having a Tg after copolymerization above 60° C. and a second monomers mixture having a Tg after copolymerization below 15° C. Such dispersions enable to obtain films having high film hardness while perfect film formation is still observed without the need of additional coalescing agents.

The copolymerization (c) reaction usually proceeds until the residual monomer content is typically lower than 1 wt %, preferably lower than 0.5 wt %, more preferably lower than 0.1 wt % based on the total amount of monomers used in step (c). The residual monomer content is determined according to DIN 55682.

An optional post-initiation can be performed in case the amount of residual monomers is higher than 1 wt % after 8 hours of reaction. It is performed by addition of an additional portion of radical initiator to ensure a residual monomer content lower than 1 wt %, preferably lower than 0.5 wt %, more preferably lower than 0.1 wt %.

The ethylenically unsaturated monomers used to prepare the copolymer (B) at step (c) can be any ethylenically unsaturated compound polymerizable by radicals known to the skilled person.

Suitable monomers for the preparation of the copolymer (B) at step (c) are those described as monomers (a3) here above.

Preferred ethylenically unsaturated monomers used to prepare the copolymer (B) at step (c) are styrenic monomers such as styrene, vinyltoluene, alpha-methylstyrene, ethylstyrene; acrylamides such as acrylamide, methacrylamide; alkyl(meth)acrylates containing from 1 to 20, preferably from 1 to 14, carbons in the alkyl group such as methyl (meth)acrylate, ethyl (meth)acrylate, propyl (meth)acrylate, butyl (meth)acrylate, pentyl (meth)acrylate, hexyl (meth)acrylate, heptyl (meth)acrylate, octyl (meth)acrylate, nonyl (meth)acrylate, decyl (meth)acrylate, undecyl (meth)acrylate, dodecyl (meth)acrylate, tridecyl (meth)acrylate, tetradecyl (meth)acrylate, isobornyl (meth)acrylate; heterocyclic (meth)acrylate like for instance tetrahydrofurfuryl (meth)acrylate; functionalized (meth)acrylates such as epoxy-functional (meth)acrylates, especially glycidyl (meth)acrylate, and hydroxyl-functionalized (meth)acrylates, such as hydroxyalkyl (meth)acrylates such as hydroxymethyl (meth)acrylate, hydroxyethyl (meth)acrylate, hydroxypropyl (meth)acrylate, hydroxybutyl (meth)acrylate, hydroxypentyl (meth)acrylate, hydroxyhexyl (meth)acrylate hydroxyheptyl (meth)acrylate, hydroxyoctyl (meth)acrylate, hydroxynonyl (meth)acrylate, hydroxydecyl (meth)acrylate, hydroxyundecyl (meth)acrylate, hydroxydodecyl (meth)acrylate, hydroxytridecyl (meth)acrylate, hydroxytetradecyl (meth)acrylate; and vinyl acetate; monomers that contain besides a polymerizable group such as a vinyl, (meth)acrylamide or (meth)acryl group also a keto group, such as diacetone (meth)acrylamide; an aceto acetoxy group, such as acetoacetoxyethyl (meth)acrylate or an ureido group (also called a 2-Oxo-1-imidazolidinyl group), such as N-(2-(meth)acryloyloxyethyl)-ethylene urea (also called 2-(2-Oxo-1-imidazolidinyl)ethyl (meth)acrylate) or ureido (meth)acrylate).

Mixtures of any of these monomers can also be used.

Also polyfunctional monomers, such as di(meth)acrylates and divinyl monomers can be used as small amounts in the preparation of copolymer (B), including functionalized di(meth)acrylates such as glycerol di(meth)acrylate. The monomers used in step (c) typically do not contain more than 3 wt % of such monomers based on the total of monomers used in step (c).

More preferred monomers for the preparation of copolymer (B) are styrene, vinyltoluene, alpha-methylstyrene, ethylstyrene, methyl (meth)acrylate, ethyl (meth)acrylate, propyl (meth)acrylate, butyl (meth)acrylate, pentyl (meth)acrylate, hexyl (meth)acrylate, heptyl (meth)acrylate, octyl (meth)acrylate, glycidyl (meth)acrylate, hydroxymethyl (meth)acrylate, hydroxyethyl (meth)acrylate, hydroxypropyl (meth)acrylate, hydroxybutyl (meth)acrylate, diacetone (meth)acrylamide, acetoacetoxyethyl(meth)acrylate, ureido (meth)acrylate and mixtures thereof.

The monomers usable for the preparation of copolymer (B) preferably do not contain large amounts of ethylenically unsaturated monomers bearing an acid group or group capable of forming an acid group when contacted with water. They typically do not contain more than 5 wt % of such monomers based on the total of monomers used in step (c).

The types and amounts of monomers usable for the preparation of copolymer (B) are preferably chosen so that copolymer (B) is hydrophobic. Hence, particularly preferred monomers (a3) have a low solubility in water, preferably less than 15%, more preferably less than 5%, and most preferably less than 3%. The solubility in water is measured at 25° C., as a percentage of grams of dissolved monomers per 100 grams of water.

The monomer mixtures used for the preparation of copolymers (B) preferably contain at least 15 wt %, more preferably at least 25 wt %, of monomers having a glass transition temperature (Tg) of their homopolymerisate of at least 50° C. based on the total of monomers used in step (c). The monomer mixtures preferably do not contain more than 90 wt %, more preferably not more than 80 wt %, of monomers having a glass transition temperature (Tg) of their homopolymerisate of at least 50° C., based on the total of monomers used in step (c). Particularly, and especially when used in a formulation without other binder resins, the monomer mixtures most preferably do not contain more than 70 wt % of monomers having a glass transition temperature (Tg) of at least 50° C., based on the total amount of monomers used in step (c).

According to a particular embodiment of the present invention, the monomers used for the preparation of copolymer (B) in step (c) contain at least 0.05 wt % of epoxy-functionalized (meth)acrylates based on the total amount of monomers used in step (c). The amount of epoxy-functionalized (meth)acrylates is preferably at least 0.5 wt %, more preferably at least 0.75 wt %. The amount of epoxy-functionalized (meth)acrylates generally does not exceed 5 wt %, preferably 3 wt %, more preferably 2.5 wt %, based on the total amount of monomers used in step (c).

According to another particular embodiment of the present invention, the monomers used for the preparation of copolymer (A) in step (a) and/or copolymer (B) in step (c) contain at least 0.05 wt % of functionalized monomers that can undergo crosslinking with an external crosslinker agent, based on the total amount of monomers used to prepare copolymer (A) in step (a) and/or copolymer (B) in step (c). Examples of functionalized monomers that can undergo crosslinking with an external crosslinker agent are hydroxyl group containing monomers such as hydroxyalkyl (meth)acrylates, and monomers that contain besides a polymerizable group such as a vinyl, (meth)acryamide or (meth)acryl group also a keto group or acetoacetoxy group, for example diacetone acrylamide, diacetone methacrylamide and acetylacetoxyethyl(meth)acrylate. The amount of this kind of functionalized monomers, especially diacetone (meth)acrylamide, is preferably at least 0.5 wt %, more preferably at least 0.75 wt %, based on the amount of monomers used for the preparation of copolymer (A), respectively copolymer (B). The amount of this type of functionalized monomers does generally does not exceed 25 wt %, preferably 20 wt %, more preferably 15 wt %, based on the total amount of monomers used to prepare copolymer (A). The amount of this type of functionalized monomers does generally of exceed 15 wt %, preferably 10 wt %, more preferably 5 wt %, based on the total amount of monomers used to prepare copolymer (B) in step (c).

According to yet another particular embodiment of the present invention, the monomers used for the preparation of copolymer (B) in step (c) contain an epoxy-functionalized (meth)acrylate monomer and contain a functionalized monomer that can undergo crosslinking with an external crosslinker agent, especially diacetone (meth)acrylamide, in the monomers used to prepare copolymer (A) and/or copolymer (B) as described here above.

According to a special embodiment of the present invention and/or the particular embodiments described here above, the monomers used for the preparation of copolymer (A) in step (a) and/or copolymer (B) in step (c), contain an ureido-functionalized monomer, especially ureido (meth)acrylate. The amount of this ureido functionalized monomers is preferably at least 0.5 wt %, more preferably at least 0.75 wt %, based on the amount of monomers used for the preparation of copolymer (A), respectively copolymer (B). The amount of ureido functionalized monomers does generally does not exceed 25 wt %, preferably 20 wt %, more preferably 15 wt %, based on the total amount of monomers used to prepare copolymer (A). The amount of ureido functionalized monomers does generally not exceed 15 wt %, preferably 10 wt %, more preferably 5 wt %, based on the total amount of monomers used to prepare copolymer (B) in step (c). The use of ureido functionalized monomers permit to improve the wet adhesion properties of the final product.

The copolymer (B) is most preferably obtained from monomers selected from styrene, vinyltoluene, alpha-methylstyrene, ethylstyrene, methyl (meth)acrylate, ethyl (meth)acrylate, propyl (meth)acrylate, butyl (meth)acrylate, pentyl (meth)acrylate, hexyl (meth)acrylate, heptyl (meth)acrylate, octyl (meth)acrylate, hydroxymethyl (meth)acrylate, hydroxyethyl (meth)acrylate, hydroxypropyl (meth)acrylate, hydroxybutyl (meth)acrylate, glycidyl (meth)acrylate, diacetone (meth)acrylamide, acetoacetoxyethyl(meth)acrylate, ureido(meth)acrylate and mixtures thereof.

The aqueous dispersion according to the invention preferably comprises:
from 10 wt % to 40 wt % of copolymer (A),
from 60 wt % to 90 wt % of copolymer (B),
based on the sum of (A) and (B).

The amount of copolymer (A) in the composition preferably is at least 12 wt %, more preferably at least 15 wt % and it does not exceed preferably 37 wt %, more preferably 35 wt %.

The amount of copolymer (B) in the composition preferably is at least 63 wt %, more preferably at least 65 wt % and it does not exceed preferably 88 wt %, more preferably 85 wt %.

The aqueous dispersion according to the present invention is usually further characterized by a solid content of from 40 to 55 wt %, preferably from 43 to 52 wt %, as determined according to DIN 55671.

The aqueous dispersion according to the present invention has typically an acid value determined on the solid content of at least 25 mg KOH/g, preferably at least 30 mg KOH/g. The acid value typically does not exceed 110 mg KOH/g, preferably 100 mg KOH/g. It can be measured according to the standard method DIN EN ISO 2114.

The aqueous dispersion according to the present invention has typically a pH of at least 7.0, preferably at least 7.3. The pH generally does not exceed 9.0, preferably 8.5.

The dynamic viscosity of the aqueous dispersion typically ranges from 100 to 8000 mPa·s at 23° C. and a shear rate of $25\ s^{-1}$, preferably from 500 to 3000 mPa·s according to DIN EN ISO 3219.

The Z-average particle size of the aqueous dispersion determined by DIN ISO 13321 preferably ranges from 50 to 200 nm, preferably from 65 to 150 nm and the particle size distribution is narrow and mono-modal, typically below 0.2, preferably below 0.15, which additionally contributes to the long-term storage stability and performance of the aqueous dispersion.

In general, it is believed that the polymer particles of the dispersion comprise an inner domain optionally substantially formed by the copolymer (B) and an outer domain optionally substantially formed by the copolymer (A). The outer domain is located at and/or towards the surface of the particles and may form a continuous or one or more discrete domains on the outer surface of the inner domain.

It is believed that the emulsifying properties of the partially or totally neutralized copolymer (A) allows the preparation of aqueous dispersions comprising a copolymer (B) that are stable without the need of the addition of an external surfactant. By stable is meant that no noticeable precipitation, sedimentation or coagulation is observed when the aqueous dispersion is stored for at least 3 months at a temperature of 40° C. Hence, the compositions according to the invention are preferably substantially free of additional surfactant. By substantially free is meant that the composition comprises less than 2 wt % on the solid content of external surfactant, preferably less than 1 wt %, more preferably less than 0.5 wt %, most preferably less than 0.1 wt %, or no detectable additional surfactant at all.

In a particular embodiment, dispersions according to the present invention may also be subject to internal crosslinking reactions due to the presence of reactive sites, especially functional groups, present in copolymer (B) that can react with suitable functional groups of copolymer (A), forming a covalent chemical bonding between copolymers (A) and (B). This way of internal crosslinking may increase the overall average molecular weight of the polymers in the final dispersions. Examples of possible internal crosslinking reactions include, but are not limited to, reactions between epoxy groups present in copolymer (B) with acid groups present in copolymer (A).

In another particular embodiment, dispersions according to the present invention may also be subject to crosslinking reactions due to the presence of binding sites present in copolymer (A) and/or copolymer (B) and in external compounds, including crosslinking agents and other compatible binders.

Suitable binding sites for crosslinking reactions may be present in copolymer (A) in the form of for instance acid functionality, hydroxyl functionality, keto-functionality originated from the monomers or monomer mixtures of (a1), (a2) and/or (a3) and/or in copolymer (B) in the form of for instance acid functionality, hydroxyl functionality, keto-functionality originated from the monomers or monomer mixtures of step (c). Suitable functional groups present on the external compound are for example epoxides, aziridine groups, carbodiimides, isocyanates, amines or hydrazides. Typically, the molar ratio of functional groups that can undergo crosslinking between copolymer (A) and/or (B) and the external compounds has to be determined in order to obtain the intended degree of crosslinking.

According to another particular embodiment, dispersions may be subject to both internal crosslinking reactions as described here above and external crosslinking reactions with external compounds or binders as described here above.

Crosslinking reactions in general will lead to a higher molecular weight of the final polymer after film formation and may lead to the introduction of new functional groups. Both effects may enhance physical and mechanical properties of the resin film, going along with a general improvement of chemical resistance and improved adhesion to substrates.

The reaction between the crosslinking agent and the composition of the invention may be inhibited by the presence of water or not. In case the crosslinking reaction is inhibited by the presence of water, the crosslinking agent may be added to the aqueous dispersion according to the present invention at any moment after completion of step (a), preferably at the end of step (c). Such crosslinking reactions are known to those skilled in the art, an example of it being the crosslinking of di- or multifunctional hydrazides with di- or multifunctional ketones and/or aldehydes.

In case the crosslinking reaction is not inhibited by the presence of water, the crosslinking agent is preferably added to the aqueous dispersion according to the present invention during formulation, before application. Such crosslinking reactions are known to those skilled in the art. Examples of possible crosslinking reactions of this type include, but are not limited to reactions of di- or poly-epoxides, di- or poly-aziridines, di- or poly-carbodiimides with acid groups present in copolymer (A) and or copolymer (B), reactions of di- or poly-isocyanates with hydroxyl-functionalities present in copolymer (A) and/or copolymer (B), oxidative crosslinking reactions of drying fatty acid containing alkyds and remaining double bonds present in the fatty acid moieties of copolymer (A).

When another compatible binder is used for crosslinking with the compositions according to the invention, they are preferably blended during formulation of the final composition to be applied on the substrate.

Various additives and compounds that are known to those skilled in the art may also be added to the aqueous dispersion according to the invention. Those additives and compounds include but are not limited to fungicides, bactericides, surfactants, pigments and extenders, active and/or inactive fillers, thickeners, substrate wetting agents, driers, organic and/or inorganic solvents, buffers, coalescing agents, defoamers, pigments, leveling additives, oils, waxes and the like.

The aqueous dispersions according to the invention are suitable as coating agents or binder agents in general. The aqueous dispersions according to the invention may be used as single binders. They also may be used in blends with at least one other binder. By "other" is meant herein a binder different from the aqueous dispersion according to the invention, including aqueous and non-aqueous binders. Binders that are compatible with the dispersion of the invention are preferred. By "compatible" is meant that no noticeable precipitation, sedimentation or coagulation is observed when the blend is stored for at least 3 months at a temperature of 40° C. Particularly preferred binders are aqueous binders. Examples include but are not limited to blends with alkyd resins, acrylic resins, polyurethane resins, epoxy resins, oils, waxes and the like, other examples include hybrid of the listed resins such as for instance acrylic-alkyd hybrid resins, acrylic-polyurethane hybrid resins, alkyd-polyurethane hybrid resins. Preferred blends are blends with alkyd resins or polyurethane dispersions.

The other binder composition may be subject to crosslinking reactions with the compositions according to the invention as detailed supra when co-reactive binding sites are present in copolymer (A) and/or copolymer (B) and in the other binder.

The aqueous dispersions according to the present invention have several advantages. They permit to obtain coatings that combine improved water resistance, good adhesion on wooden substrates and good wood-penetration characteristics. Generally, the aqueous dispersions according to the present invention permit to obtain a high and stable gloss level if used as a single binder or when used in blends with compatible binders like alkyd resins. They also show a very short tack-free time when dried at ambient conditions and the resulting polymer films prove to have excellent weatherability. The dispersions according to the invention have an enhanced miscibility and compatibility with alkyd resins. In case multi-domain morphologies are implemented in copolymer (B), high film hardness may be achieved while perfect film formation is still observed without the need of additional coalescing agents. Even further increased chemical resistance may be achieved by blending with crosslinking agents or binders that can undergo crosslinking reactions with the aqueous dispersions according to the present invention.

The present invention also relates to the process to prepare the aqueous dispersion. The features of the process are as described above.

The aqueous dispersions according to the invention may be used on various substrates. Examples of possible substrates include but are not limited to wood, wood fibre, cellulose, polymeric substrates such as polystyrene, polyolefins, polyesters, polyamides, polyurethanes, polycarbonates and the like, inorganic substrates like metal and pretreated metal substrates, concrete, glass and silicates in general.

The aqueous dispersions according to the invention may be applied to the substrates by various techniques known to those skilled in the art. Those techniques include but are not limited to brushing, spraying, dipping, pouring, draining, electro-depositioning, roller coating and the like. The drying of formulations containing the aqueous dispersions according to the invention may either happen at ambient temperature or at forced conditions like elevated temperature and/or reduced pressure for a variable time.

The aqueous dispersions according to the invention, formulations and blends thereof are particularly suitable for applications on natural substrates like wood, cellulose and the like. The dispersions according to the invention are particularly suitable for wood stain, wood trim and stain blocking applications for the high weatherability, high adhesion, water resistance, high gloss, stability, wood-penetration characteristics and enhanced miscibility with alkyd resins. Furthermore, the enhanced adhesion characteristics as well as the high chemical stability, water resistance and enhanced weatherability may also be advantageous for various other organic and/or inorganic substrates like polymeric, metal, concrete or glass substrates.

Applicants have found that the use of dispersions according to the invention in blends with oxidatively drying alkyds, permit to obtain coatings that maintain the beneficial properties of the alkyd resins such as high gloss, good flow, long open time and excellent wood penetration and that in addition the dispersions permit to obtain fast curing of the blends without the need to use siccatives, also called dryers, usually necessary to cure those alkyd resins. Indeed, Applicants have unexpectedly found that in blends containing predominantly oxidatively drying alkyd resins, the presence of even relatively small amounts of acrylic dispersions according to the invention permit to obtain fast curing even without the presence of siccatives.

Oxidatively drying alkyds contain unsaturated groups, in particular carbon-carbon double bounds, that can react with oxygen from the air, causing the alkyd resins to crosslink, forming a three-dimensional network, and harden. The oxidative curing process, although not drying, gives the appearance of drying and is often referred to as such. In the absence of catalysis, drying will proceed very slowly. Therefore, it is customary to include in compositions of alkyds small quantities of metal salts, often referred to as driers or siccatives, which will catalyse the polymerization of unsaturated groups as to form the three-dimensional network. Siccatives used for coatings are typically metal salts or complexes based on cobalt, manganese, iron, vanadium, lead and copper. Cobalt based driers usually give the fasted drying results, but may present toxicological issues. There is therefore a need to develop alternatives to the use of those metal based siccatives for curing oxidatively drying alkyds.

The present invention therefore also relates to the use of the dispersions according to the invention for preparing blends based on oxidatively drying alkyds and which are substantially free of siccatives. The invention further relates to blends predominantly based on at least one oxidatively drying alkyd resin comprising a dispersion according to the invention as herein described in an amount such that the amount of copolymer (A) and copolymer (B) is from 5 to 40 wt % and the amount of alkyd resin is from 60 to 95 wt % based on the total amount of copolymer (A), copolymer (B) and alkyd resin.

The blends according to the invention are preferably aqueous blends comprising at least one water-soluble, water-thinnable or water-dilutable oxidatively drying alkyd and at least one aqueous dispersion comprising a copolymer (A) and a copolymer (B) according to the invention as described here above.

The aqueous blend according to the present invention is usually further characterized by a solid content of from 40 to 55 wt %, preferably from 43 to 52 wt %, as determined according to DIN 55671.

The relative total amount of copolymer (A) and copolymer (B) in the blend according to the invention is from preferably at least 5 wt %, more preferably at least 10 wt % based on the total amount of copolymer (A), copolymer (B) and oxidatively drying alkyd resin. The relative total amount of copolymer (A) and copolymer (B) in the blend according to the invention does preferably not exceed 30 wt %, more preferably 20 wt %, based on the total amount of copolymer (A), copolymer (B) and oxidatively drying alkyd resin.

The relative total amount of oxidatively drying alkyd resin in the blend according to the invention is from preferably at least 70 wt %, more preferably at least 80 wt % based on the total amount of copolymer (A), copolymer (B) and oxidatively drying alkyd resin.

The relative total amount of oxidatively drying alkyd resin in the blend according to the invention does from preferably not exceed 95 wt %, more preferably 90 wt %, based on the total amount of copolymer (A), copolymer (B) and oxidatively drying alkyd resin.

Conventional oxidatively drying alkyd resins, also called air-drying alkyd resins, can be obtained using a condensation reaction of a polyvalent alcohol, or several polyvalent alcohols, of one or several polycarboxylic acid(s) or the corresponding anhydrides, and long-chain unsaturated fatty acids or oils. The skeleton of these alkyd resins is a polyester comprised of building blocks derived from polyols and polycarboxylic acids. Unsaturated fatty acids or groups derived from a drying or semidrying oil, or several drying or semidrying oils, are covalently bonded with this skeleton. Glycerine is herein frequently employed as the polyol. Other, non-limiting examples of suitable polyvalent alcohols are pentaerythrite, di-pentaerythrite, ethylene glycol, diethylene glycol, propylene glycol, neopentyl glycol, trimethylol propane, trimethylol ethane, di-trimethylol propane and 1,6-hexanediol. The di- and polycarboxylic acids and corresponding anhydrides utilized for the production of the alkyd resins can be aromatic, aliphatic and cycloaliphatic components from petrochemical starting materials. Such polycarboxylic acids are, for example, phthalic acid and its isomeric isophthalic acid and terephthalic acid, trimellitic acid, pyromellitic acid, pimelic acid, adipic acid, azelaic acid, sebacinic acid, maleic acid, fumaric acid, tetra- and hexa-hydrophthalic acid and cyclohexane dicarboxylic acid.

Monofunctional acids such as benzoic acid or p-tert-butyl benzoic acid can be employed to enhance the hardness. The oxidatively drying alkyd can also be modified through conversion of the completed alkyd resin with agents such as olefinically unsaturated compounds, epoxide functional compounds or isocyanate functional compounds or during its synthesis, in particular through grafting of an alkyd resin, or the fatty acids utilized as starting substances for alkyd resins, with olefinically unsaturated monomers, in particular styrene, vinyl toluol and/or para-methyl styrene, maleic acid anhydride or monomers derived from acrylic acid or methacrylic acid, such as these acids themselves and their alkyl or hydroxyalkyl esters or mixtures of two or more of such olefinically unsaturated monomers, by conversion of the completed alkyd resins with hydroxy functional silicon oligomers or polymers, by reesterification or reamidation of alkyd resins with polyamidoamines at increased temperatures starting at 180° C., by conversion of, in particular, long oil hydroxy functional alkyd resins with polyfunctional isocyanates, by conversion preferably of triglycerides with epoxide resins to form a mixture of fatty acid modified epoxide resins and mono- and di-glycerides, wherein these mixtures are subsequently converted with di- or polycarboxylic acids to form epoxide alkyd resins, phenolic resin modified alkyd resins, and maleinate alkyd resins comprising as an acid component an adduct of maleic acid anhydride and resin acids such as abietinic acid, palustrinic acid, pimaric acid and isopimaric acid or mixtures thereof.

The broad distribution of molar masses generated in the polycondensation leads to high viscosity of the resins. Fractions with higher molar mass have an advantageous effect on the drying rate, however, they also increase the viscosity of the binder, while fractions with lower-molecular oligomers lead to lower viscosities; however, they slow down the development of hardness.

The alkyd resin, which is preferably used according to the invention is selected from the group comprised of
a) alkyd resins that can be produced from fatty acids, polyvalent alcohols and polybasic organic acids,
b) alkyd resins that can be produced from oils, polyvalent alcohols and polybasic organic acids,
c) urethane alkyds that can be obtained by conversion of hydroxy functional alkyd resins a) or b) with polyfunctional isocyanates,
d) alkyd resins that can be obtained by grafting an alkyd resin a) or b), or the fatty acids utilized in their production, with olefinically unsaturated monomers, and further polymerization of those monomers so that an acrylic-modified alkyd is obtained
e) alkyd resins that can be obtained by conversion of an alkyd resins a) or b) with hydroxy functional silicon oligomers or polymers, wherein the alkyd resin before the conversion, through the reaction with a suitable agent, is provided for example with an isocyanate functionality or an acid anhydride functionality,
f) alkyd resins that can be obtained by transesterification or transamidation of an alkyd resin a) or b) with polyamidoamines at increased temperatures starting at 180° C.,
g) epoxide alkyd resins by conversion of a mixture of fatty acid-modified epoxide resins and mono- and di-glycerides with di- or polycarboxylic acids,
h) phenolic resin-modified alkyd resins, and
i) maleinate alkyd resins comprising an adduct of an alkyd resin and an olefinically unsaturated acid component selected from maleic acid anhydride and resin acids, preferably abietinic acid, palustrinic acid, pimaric acid and/or isopimaric acid or mixtures thereof, wherein the fatty acids or oils utilized for the synthesis preferably comprise a mass fraction of at least monounsaturated fatty acids of at least 3%;
or combinations thereof.

Particularly preferred are water-soluble, water-thinnable or water-dilutable alkyd resins.

More preferred are acrylic modified alkyd resins, urethane modified alkyd resins and alkyd-polyurethanes hybrids comprising moieties derived from acrylic modified alkyd resins. This type of alkyd resins is for example described in U.S. Pat. Nos. 5,698,625, 6,489,398, EP 0267562, EP 0444454 and WO 2012/013611.

A person of skill in the art is sufficiently familiar with alkyd resins and methods for their production.

The aqueous dispersions of copolymer (A) and (B) used in the blends according to the invention can be any of the dispersions described here above, particularly also in the preferred embodiments.

Particularly preferred are dispersions that contain a copolymer (B) that is obtained with monomer mixtures containing at least 40 wt % of monomers having a glass transition temperature (Tg) of their homopolymerisate of at least 50° C. based on the total of monomers used in step (c). The monomer mixtures preferably do not contain more than 85 wt % of monomers having a glass transition temperature (Tg) of their homopolymerisate of at least 50° C., based on the total of monomers used in step (c).

The blends according to the invention present a short tack free time and a short through drying time, comparable or even better, with oxidatively drying alkyd resins used in combination with the usual siccatives. The blends according to the invention permit to obtain coatings with a high gloss, comparable with the gloss obtained with the alkyd resin alone (in combination with usual siccative to obtain drying). The blends according to the invention permit to obtain coatings with improved water resistance.

Various additives and compounds that are known to those skilled in the art may also be added to the blends according to the invention. Those additives and compounds include but are not limited to fungicides, bactericides, surfactants, pigments and extenders, active and/or inactive fillers, thickeners, substrate wetting agents, organic and/or inorganic solvents, buffers, coalescing agents, defoamers, pigments, leveling additives, oils, waxes and the like.

Although siccatives can be added to the blends according to the invention, they are not necessary to obtain good drying properties. The blends according to the invention are preferably substantially free of siccatives. By substantially free is meant to understand quantities of less than 1 wt %, preferably less than 0.1 wt %, most preferably less than 0.01 wt % of siccative, based on the weight of oxidatively drying alkyd resin in the blend.

The blends according to the present invention have several advantages. They permit to obtain coatings that combine improved water resistance, good adhesion on wooden substrates and good wood-penetration characteristics. Generally, the blends according to the present invention permit to obtain a high and stable gloss level. They also show a very short tack-free time when dried at ambient conditions and the resulting polymer films prove to have excellent weatherability. In case multi-domain morphologies are implemented in copolymer (B), high film hardness may be achieved while perfect film formation is still observed without the need of additional coalescing agents. Even further increased chemical resistance may be achieved by blending with crosslinking agents or binders that can undergo crosslinking reactions with the aqueous dispersions according to the present invention.

The present invention also relates to the process to prepare the blends, by first preparing an aqueous dispersion according to the invention according to the features as described above and then blending this dispersion with the oxidatively drying alkyd resin, preferably prepared as an aqueous solution or dispersion.

The blends according to the invention may be used on various substrates. Examples of possible substrates include those described in relation to the aqueous dispersions according to the invention. The blends according to the invention may be applied to the substrates by various techniques known to those skilled in the art and as described here above in relation to the aqueous dispersions according to the invention.

The blends according to the invention are particularly suitable for applications on natural substrates like wood, cellulose and the like. The blends according to the invention are particularly suitable for wood stain, wood trim and stain blocking applications for the high weatherability, high adhesion, water resistance, high gloss, stability and wood-penetration characteristics. Furthermore, the enhanced adhesion characteristics as well as the high chemical stability, water resistance and enhanced weatherability may also be advantageous for various other organic and/or inorganic substrates like polymeric, metal, concrete or glass substrates.

The present invention further relates to a process for preparing a coated substrate or article, wherein at least part of the surface of the substrate or article is coated with an aqueous dispersion according to the invention or with a blend according to the invention. The invention finally relates to the coated substrates or articles hereby obtained.

The examples which follow illustrate the invention without limiting it.

Preparation of Copolymers 1 to 7 and Comparative Copolymer 9

The types and amounts of reagents used to prepare Copolymers 1-7 and Comparative Copolymer 9 are summarized in Table 1.

The fatty acid is charged into a 1000 mL three neck round glass reactor. The reactor is purged with nitrogen and heated to 140° C. The mixture of monomers as mentioned in Table 1, di-t-butyl peroxide and n-butyl-3-mercaptopropionate is continuously added to the reaction mixture over a period of 3 hours at 140° C. under vigorous stirring. The reaction temperature is kept at 140° C. for additional 2 hours until full conversion of the monomers is observed. The system is then cooled to ambient temperature. In case the reaction product is solid at ambient temperature it is mechanically crushed to yield solid flakes.

Characteristics of Copolymers 1-7 and Comparative Copolymer 9 are summarized in Table 1 and are obtained according to the test methods described in the specification.

In the case of Copolymer 6, a keto-functionalized product is obtained.

Preparation of Comparative Copolymer 8

The types and amounts of reagents used to prepare Comparative Copolymer 8 are summarized in Table 1. No fatty acid is used in the preparation of Comparative Copolymer 8.

Ethyl glycol acetate (solvent process) is charged into a 1000 mL three neck round glass reactor. The reactor is purged with nitrogen and heated to 187° C. The mixture of monomers as mentioned in Table 1 and di-t-butyl peroxide is continuously added to the reaction mixture over a period of 3 hours at 187° C. under vigorous stirring. The reaction temperature is kept at 187° C. for one additional hour until full conversion of the monomers is observed. Then the process solvent (ethyl glycol acetate) is stripped under vacuum at a temperature of >200° C. until the solid content of the reaction product is found to be >99%. The system is then cooled to ambient temperature and the solid reaction product is mechanically crushed to yield solid flakes. Characteristics of Comparative Copolymer 8 are summarized in Table 1.

For better comparison the total amount of ethylenically unsaturated monomers and fatty acids has been normalized to sum up to 100 g in Table 1.

TABLE 1

| Composition (g) of Copolymers 1-7 and Comparative Copolymers 8-9: | | | | | | | | | |
|---|---|---|---|---|---|---|---|---|---|
| | Copolymer 1 | Copolymer 2 | Copolymer 3 | Copolymer 4 | Copolymer 5 | Copolymer 6 | Copolymer 7 | Comparative Copolymer 8 | Comparative Copolymer 9 |
| Soybean oil FA | 33 | 20 | 33 | — | 33 | 33 | — | — | 33 |
| Linseed oil FA | — | — | — | 33 | — | — | — | — | — |
| Tall oil FA | — | — | — | — | — | — | 30 | — | — |
| Styrene | 21.8 | 26 | 43.6 | 43.6 | 21.8 | 33.6 | 46.5 | 32.6 | 60 |
| A-Me-Sty | 21.8 | 26 | — | — | — | — | — | 32.6 | — |
| IBOMA | — | — | — | — | 21.8 | — | — | — | — |
| DAAM | — | — | — | — | — | 10 | — | — | — |
| M | 23.4 | 28 | 23.4 | 23.4 | 23.4 | 23.4 | 23.5 | 34.8 | 7 |
| PER | 3.3 | 3.3 | 3.3 | 3.3 | 3.3 | 3.3 | 3.3 | 1.8 | 3.3 |
| BMP | 0.6 | 0.6 | 0.6 | 0.6 | 0.6 | 0.6 | 0.6 | — | 0.6 |
| EGA | — | — | — | — | — | — | — | 36.3 | — |
| DIS | — | — | — | — | — | — | — | 36.3 | — |
| Solids [%] | >99 | >99 | >99 | >99 | >99 | >99 | >99 | >99 | >99 |
| AN [mg KOH/g] | 207 | 210 | 240 | 215 | 229 | 270 | 240 | 215 | 119 |
| $M_w$ [Da] | 7070 | 6820 | 5410 | 7600 | 6740 | 7200 | 5700 | 5500 | 6600 |

In above table:
FA stands for fatty acid;
α-Me Sty stands for alpha-methyl styrene;
IBOMA stands for Isobornyl methacrylate;
DAAM stands for Diacetone acrylamide;
AA stands for acrylic acid;
PER stands for di-t-butyl peroxide;
BMP stands for n-Butyl 3-mercapto propionate;
EGA stands for Ethyl glycol acetate (process solvent);
DIS stands for Distillate of process solvent;
Solids % stands of the Solids content [%];
AN stands for Acid number.

Preparation of Dispersions 1a to 7 and Comparative Dispersion 8

The types and amounts of reagents used to prepare Dispersions 1a-7b and Comparative Dispersion 8 are summarized in Table 2.

A 1000 mL three neck round glass reactor is charged with de-ionized water and aqueous ammonia (25%). The resulting mixture is heated to 80° C., then the emulsifier resin (Copolymer 1 to 7 or Comparative Copolymer 8) is portion-wise added to the reaction vessel and the resulting slurry is stirred for one hour at 80° C., resulting in a clear, transparent, yellowish solution of low viscosity and 25% solids content. A prepared solution of ammonium peroxodisulfate in de-ionized water (10% solids content) is added to the reaction mixture at 80° C. and vigorously stirred for 10 minutes. Then a prepared mixture of ethylenically unsaturated monomers as mentioned in Table 2 is continuously added to the reaction mixture at 80° C. over a period of 4 hours.

In case of Dispersions 3b, 5, 7a and 7b two different mixtures of monomers are added sequentially. The first monomer mixture in the sequence is added at 80° C. over a period of 1 hour and 20 minutes. 10 minutes after the end of the first sequential addition of monomers, the second mixture of monomers is added at 80° C. over a period of 2 hours and 40 minutes.

In case of Dispersions 1a to 5, 7a and 7b and Comparative Dispersion 8a redox post-initiation is performed. The waterborne dispersion obtained after 4 h of polymerization is allowed to cool to 60° C., followed by the addition of t-butyl hydroperoxide (70%). 10 minutes after the addition of the hydroperoxide a pre-mixed solution of L-ascorbic acid in de-ionized water (3% solids content) is continuously added to the reaction mixture at 60° C. over a period of 30 minutes, yielding the final Dispersion as opaque, slightly yellowish dispersion.

In case of Dispersion 6 the redox post-initiation step has not been carried out. In this case the obtained waterborne dispersion is stirred for additional 2 hours at 85° C. after the addition of monomers has been completed in order to ensure almost complete conversion of monomers. Then the obtained dispersion is allowed to cool to 40° C., followed by the addition of a pre-mixed solution of adipic acid dihydrazide in de-ionized water (3% solids content).

Adipic acid dihydrazide acts as a water-inhibited cross-linking agent for the keto-functionalized Dispersion 6 and 7b.

In case of Dispersion 7a and 7b the second monomer mixture in the sequence contains glycidylmethacrylate, an epoxy-functionalized monomer that is able to react with acid groups present in Copolymer 7 resulting in internal cross-linking between Copolymer 7 and the copolymer prepared in the present example. This crosslinking results in a high build-up of the molecular weight of Dispersion 7a and 7b. In case of Dispersion 7b further crosslinking after film drying can be achieved by reaction of adipic acid dihydrazide with the diacetone acrylamide moiety present in the polymer.

In general, the amount of ammonia is chosen to result in a pH of 7.5 to 8.5 for the final Dispersions, ensuring a neutralization degree of >80%, based on the amount of acid groups present in the Copolymers 1 to 6 or Comparative Copolymer 7. The amount of de-ionized water has been adjusted to yield the final Dispersions with a dynamic viscosity below 8000 mPa·s at 23° C. and a shear rate of 25 $s^{-1}$ according to DIN EN ISO 3219. Characteristics of the Dispersions are summarized in Table 2 and are obtained according to the test methods described in the specification.

Comparative Dispersion 9

Comparative Copolymer 9 is portion-wise added to a pre-mixed solution of aqueous ammonia (25%) in de-ionized water at 80° C. The amounts of water and ammonia have been chosen to yield a neutralization degree of 100% and a solid content of 25%. The resulting slurry is stirred for three hours at 80° C., resulting in an opaque, yellowish dispersion of high viscosity. Cooling to ambient temperature results in partial phase separation of the dispersion, clearly showing that the Comparative Copolymer 9 is lacking sufficient water solubility due to its low acid number. Comparative Copolymer 9 is not suitable to act as emulsifier in the next copolymerization step (c)

Based on those findings the copolymerization step (c) has not been carried out as insufficient stability of the final dispersion is to be expected.

The compositions of Dispersions 1a-7b and Comparative Dispersion 8 are summarized in Table 2.

For better comparison the total amount of ethylenically unsaturated monomers and Copolymers 1 to 7 and Comparative Copolymer 8 used in synthetic step (c) has been normalized to sum up to 100 g. The various amounts of de-ionized water used in synthetic step (c) are summarized in one row to show the overall amount.

TABLE 2

Summary of the final composition of Dispersions 1a-7b and Comparative Dispersion 8

|  |  | Disp 1a | Disp 1b | Disp 2 | Disp 3a | Disp 3b | Disp 4 |
|---|---|---|---|---|---|---|---|
|  | Copolym 1 | 25 | 25 | — | — | — | — |
|  | Copolym 2 | — | — | 25 | — | — | — |
|  | Copolym 3 | — | —h | — | 25 | 25 | — |
|  | Copolym 4 | — | — | — | — | — | 25 |
|  | Copolym 5 | — | — | — | — | — | — |
|  | Copolym 6 | — | — | — | — | — | — |
|  | Copolym 7 | — | — | — | — | — | — |
|  | Comp. Cop8 | — | — | — | — | — | — |
|  | water(total) | 90.4 | 90.4 | 90.4 | 90.4 | 94.3 | 94.3 |
|  | Am. 25% | 6.1 | 5.8 | 6.9 | 5.9 | 5.8 | 5.8 |
|  | APODS | 0.52 | 0.52 | 0.52 | 0.52 | 0.52 | 0.52 |
| First | EHA | 20 | 8 | 20 | 20 | 3 | 20 |
| mono. | BA | 20 | 8 | 20 | 20 | 3 | 20 |
| Mixt. | MMA | 35 | — | — | — | 20 | 35 |
| seguence | Sty | — | 59 | 35 | 35 | — | — |
| Sec. | EHA | — | — | — | — | 13 | — |
| mono. | BA | — | — | — | — | 13 | — |
| Mixt. | MMA | — | — | — | — | 23 | — |

TABLE 2-continued

Summary of the final composition of Dispersions 1a-7b and Comparative Dispersion 8

| Seguence | GMA | — | — | — | — | — | — |
|---|---|---|---|---|---|---|---|
| | DAAM | — | — | — | — | — | — |
| | PER | 0.35 | 0.35 | 0.35 | 0.35 | 0.35 | 0.35 |
| | ASCA | 0.24 | 0.24 | 0.24 | 0.24 | 0.24 | 0.24 |
| | AADH | — | — | — | — | — | — |
| Solid content (%) | | 50.7 | 49.5 | 49.7 | 49.6 | 48.7 | 46.7 |
| Acid number (mg KOH/g) | | 66 | 64 | 67 | 71 | 68 | 66 |
| Dynamic viscosity (mPa · s) | | 1555 | 1240 | 5254 | 2950 | 1044 | 510 |
| pH | | 8.1 | 7.7 | 8.3 | 7.7 | 7.8 | 7.8 |
| Part.size Z-average (nm) | | 91 | 92 | 83 | 87 | 106 | 113 |
| Part.size polydispersity index | | 0.09 | 0.08 | 0.14 | 0.09 | 0.09 | 0.10 |
| Mw (Da) | | 102600 | 189000 | 192000 | 194000 | 107000 | 144000 |

| | | Disp 5 | Disp 6 | Disp 7a | Disp 7b | Comp. D.8 |
|---|---|---|---|---|---|---|
| | Copolym 1 | — | — | — | — | — |
| | Copolym 2 | — | — | — | — | — |
| | Copolym 3 | — | — | — | — | — |
| | Copolym 4 | — | — | — | — | — |
| | Copolym 5 | 20 | — | — | — | — |
| | Copolym 6 | — | 25 | — | — | — |
| | Copolym 7 | — | — | 18 | 20 | — |
| | Comp. Cop8 | — | — | — | — | 25 |
| | water(total) | 90.4 | 132.6 | 94.5 | 93.5 | 95.1 |
| | Am. 25% | 4.7 | 5.8 | 4.8 | 5.3 | 6.6 |
| | APODS | 0.52 | 0.57 | 0.6 | 0.6 | 0.52 |
| First mono. Mixt. | EHA | 3.5 | 20 | 3.35 | 3.35 | 20 |
| | BA | 3.5 | 20 | 3.35 | 3.35 | 20 |
| | MMA | 24 | 35 | — | — | — |
| seguence | Sty | — | — | 18.3 | 18.3 | 35 |
| Sec. mono. Mixt. | EHA | 13 | — | 15.5 | 15 | — |
| | BA | 13 | — | 15.5 | 15 | — |
| | MMA | 23 | — | 24.5 | 23 | — |
| Seguence | GMA | — | — | 1.5 | 1 | — |
| | DAAM | — | — | — | 1 | — |
| | PER | 0.35 | — | 0.35 | 0.35 | 0.35 |
| | ASCA | 0.24 | — | 0.24 | 0.24 | 0.24 |
| | AADH | — | 1.2 | — | 0.5 | — |
| Solid content (%) | | 49.9 | 42.7 | 49.7 | 50.2 | 48.7 |
| Acid number (mg KOH/g) | | 54 | 76 | 48 | 50 | 72 |
| Dynamic viscosity (mPa · s) | | 808 | 7490 | 501 | 266 | 583 |
| pH | | 8.1 | 7.5 | 8.3 | 8.3 | 8.4 |
| Part.size Z-average (nm) | | 81 | 136 | 66 | 72 | 89 |
| Part.size polydispersity index | | 0.13 | 0.18 | 0.09 | 0.10 | 0.08 |
| Mw (Da) | | 115000 | 232000 | 5300000 | 7520000 | 337000 |

In above table
Am. stands for ammonia;
APODS stands for Ammonium peroxodisulfate;
EHA stands for 2-Ethylhexyl acrylate;
BA stands for Butyl acrylate;
MMA stands for Methyl methacrylate,
Sty stands for Styrene;
GMA stands for Glycidyl methacrylate;
DAAM stands for Diacetone acrylamide,
PER stand for t-Butyl hydroperoxide 70%;
ASCA stands for Ascorbic acid;
AADH stands for Adipic acid dihydrazide.

Formulations 1 to 8 and Comparative Formulation 9

The performances of the Dispersions described above have been evaluated in basic wood stain formulations (Table 3).

TABLE 3

| Wood stain formulation | |
| --- | --- |
| Amount of Dispersion X [g solids] based on solid content | 27.6 (solids) |
| ADDITOL ® VXW 6503 (substrate wetting agent) [g] | 0.40 |
| ADDITOL ® VXW 6386 N (defoamer) [g] | 0.40 |
| LUCONYL ® (red/yellow/brown = 40:39:1) [g] (pigment paste) | 6.70 |
| De-ionized water [g] | amount is set to 40% overall solid content |

For evaluation of physical and chemical performances the Formulations 1 to 8 and the Comparative Formulation 9 are coated on a glass-plate with a wet-film thickness of 80 μm using a standardized coating bar. Then the resin film is allowed to dry for 24 hours at 23° C. and 55% rh (relative humidity) prior to evaluation. The evaluation of the tack-free time has been carried out during the drying procedure.

The formulated Dispersions are evaluated for various performances according to the below evaluation tests:

Water resistance: The evaluation of water resistance is carried out on the resin film after 24 hours of drying at 23° C. and 55% relative humidity (rh). 1.0 g of de-ionized water is dropped on the dry resin film to form one large water drop. The water drop is covered with a transparent glass-lid in order to avoid evaporation. The values listed in Table 4 are given in hours [h] and minutes ['], giving the time of water exposure that is needed to show significant whitening, swelling or blistering of the resin film underneath the water drop by optical evaluation.

Tack free time: The values given in Table 4 represent the time after coating of the resin film that is needed for the film to dry at 23° C. and 55% rh and to become tack-free. By "tack-free" is meant that slight pressing on the resin film with the fingertip does not leave any press-marks on the coated film.

Gloss level: The evaluation of the gloss level is carried out on the resin film after 24 hours of drying at 23° C. and 55% rh. The values listed in Table 4 are given in gloss units [GU] for an angle of <60° according to DIN EN ISO 2813.

Pendulum hardness: The evaluation of pendulum hardness is carried out on the resin film after 24 hours of drying at 23° C. and 55% rh according to DIN EN ISO 152. The values given in Table 5 are listed in seconds [s].

The testing results of the Formulations 1 to 8 are listed in Table 4 and Table 5 in comparison to the performance of Comparative Formulation 9, which serves as a reference without fatty acid modification.

TABLE 4

| Comparison of formulation performances | | | | | | | | | |
| --- | --- | --- | --- | --- | --- | --- | --- | --- | --- |
| | Formulation 1 | Formulation 2 | Formulation 3 | Formulation 4 | Formulation 5 | Formulation 6 | Formulation 7 | Formulation 8 | Comparative Formulation 9 |
| Dispersion used in Formulation | | | | | | | | | |
| | Dispersion 1a | Dispersion 2 | Dispersion 3a | Dispersion 3b | Dispersion 4 | Dispersion 5 | Dispersion 6 | Dispersion 7a | Comparative Dispersion 8 |
| Testing procedure | | | | | | | | | |
| Water resistance [h; min] after 24 h drying 80 μm wet film thickness on glass | 2 h | 4 h | 2 h | 2 h | 2 h | 2 h | 2 h | 7 h | 20' |
| Tack-free time [h; min] 80 μm wet film thickness on glass | 1 h | 1 h 35' | 1 h 30' | 47' | 1 h | 1 h 16' | 1 h 06' | 1 h | 1 h 35' |
| Gloss level (DIN EN ISO 2813; <60°)[GU] after 24 h drying 80 μm wet film thickness on glass | 93 | 97 | 97 | 83 | 92 | 87 | 89 | 98 | 98 |

Table 4 shows that all formulations based on the Dispersions according to the invention (Dispersion 1a-Dispersion 7a) show a strong increase in water resistance in comparison to Comparative Formulation 9, based on Comparative Dispersion 8.

Dispersion 7a shows the most significant increase in water resistance.

Enhanced water resistance and especially enhanced early water resistance are key aspects for coating materials and binders used in all outdoor applications. Increased water resistance may prolong the outdoor time life of a coating material itself and may also result in an enhanced substrate protection.

The formulations based on the Dispersions according to the invention further show a tack-free time that is comparable or shorter than for the Comparative Formulation 8.

Gloss levels of all Dispersions are high.

In conclusion, the formulations comprising the Dispersions according to the invention show improved water resistance, short tack-free times and high gloss levels.

Formulations 4, 6 and Comparative Formulation 9 are further evaluated for hardness and the results are summarized in Table 5.

TABLE 5

Comparison of formulation performances: pendulum hardness

|  | Formulation 4 | Formulation 6 | Comp. Form. 9 |
|---|---|---|---|
| Dispersion used in Formulation | Dispersion 3b | Dispersion 5 | Comp. Disp. 8 |
| Testing Procedure |  |  |  |
| Pendulum hardness (DIN EN ISO 152) [s] after 24 h drying 80 μm wet film thickness on glass | 87" | 68" | 44" |

The pendulum hardness of the formulations based on Dispersion 3b and Dispersion 5 is significantly higher than the one of Comparative Formulation 9 comprising Comparative Dispersion 8.

DSC analysis of Dispersion 3b and 5 demonstrates the existence of multiple Tg's showing that the sequential addition of different monomer mixtures during the synthesis leads to a multi-Tg domain morphology (see Table 6).

In the case of Dispersion 3b and 5, the domain formed thanks to the addition of the first monomer mixture in step (c) has a Tg above 60° C. and the domain formed thanks to the addition of the second monomer mixture has a Tg below 15° C. It is believed that the high Tg domain provides the high hardness and that the low Tg domain provides the good film formation at ambient temperature even without the need of additional coalescing agents.

Those examples show the benefit of multi-domain structures being present in the copolymer (B).

TABLE 6

DSC results for Dispersion 3b and Dispersion 5.

| Tgs found by DSC analysis | Dispersion 3b | Dispersion 5 |
|---|---|---|
| $1^{st}$ Tg (related to copolymer (A)) | 102° C. | 108° C. |
| $2^{nd}$ Tg (related to one domain in copolymer (B)) | 69° C. | 71° C. |
| $3^{rd}$ Tg (related to a $2^{nd}$ domain in copolymer (B)) | 12° C. | 12° C. |

Blending Experiments with Alkyd Resins

In addition to the screening of the formulations described above, blending experiments of Dispersions 1a, 1b, 2, 3a, 3b, 4, 5, 6, 7a and 7b and Comparative Dispersion 8 with a reference alkyd RESYDROL® AY 586/45WA have been carried out.

Furthermore, Comparative Dispersion 10 has been synthesized according to Example 1 of U.S. Pat. No. 5,434,215 and blended with the reference alkyd. In this prior art an aqueous polymeric dispersion incorporating a wax is synthesized in order to enhance hydrophobicity and increase water resistance of the polymer. The emulsion polymerization of the monomers is performed in the presence of the wax but the wax is not covalently bound to the polymeric backbone.

All blends have been formulated as follows:

Dispersion X/RESYDROL® AY 586=50:50 (based on solid content of components)

The two components are mixed at 23° C. and then homogenized by stirring at 23° C. for 30 minutes. Stable blends have been stored for 3 months at 40° C. in order to evaluate the corresponding storage stability at elevated temperatures.

The outcome of the blending experiments is summarized in Table 7.

TABLE 7

Blending experiments with a reference alkyd.

| Dispersion used for blending | Observations during blending experiment | Blend stability on storage testing (3 months storage at 40° C.) |
|---|---|---|
| Dispersion 1a | stable, homogeneous blend | stable blend; no coagulation, sedimentation or phase separation |
| Dispersion 1b | stable, homogeneous blend | stable blend; no coagulation, sedimentation or phase separation |
| Dispersion 2 | stable, homogeneous blend | stable blend; no coagulation, sedimentation or phase separation |
| Dispersion 3a | stable, homogeneous blend | stable blend; no coagulation, sedimentation or phase separation |
| Dispersion 3b | stable, homogeneous blend | stable blend; no coagulation, sedimentation or phase separation |
| Dispersion 4 | stable, homogeneous blend | stable blend; no coagulation, sedimentation or phase separation |
| Dispersion 5 | stable, homogeneous blend | stable blend; no coagulation, sedimentation or phase separation |
| Dispersion 6 | stable, homogeneous blend | stable blend; no coagulation, sedimentation or phase separation |
| Dispersion 7a | stable, homogeneous blend | stable blend; no coagulation, sedimentation or phase separation |
| Dispersion 7b | stable, homogeneous blend | stable blend; no coagulation, sedimentation or phase separation |
| Comparative Dispersion 8 | immediate coagulation on mixing, sedimentation of large particles after stirring | not tested |
| Comparative Dispersion 10 | immediate coagulation on mixing, sedimentation of large particles after stirring, phase separation of the wax component after stirring | not tested |

The stability of the blends of the Dispersions 1a to 7b according to the present invention with the reference alkyd RESYDROL® AY 586/45WA is drastically increased in comparison to the blend stability of Comparative Dispersions 8 and 10 in the same blend formulation. Comparative Dispersions 8 and 10 exhibit significant coagulation and the formation of a solid precipitate when blended with the alkyd. Furthermore, the separation of a wax component is observed for Comparative Dispersion 10.

All blends based on the Dispersions according to the present invention and the reference alkyd proved to be stable on storage at elevated temperature (40° C.) for 3 months of testing time.

Formulation 10 and Comparative Formulation 11

Example 3 (BEISPIEL 3) of EP 0305795 has been reproduced following the recipe described in the patent. The product obtained has a copolymer backbone comprising a fatty acid building block in the chain on which an alkyd is grafted by esterification. Besipiel 3 and Dispersion 3b are formulated in a wood stain formulation according to the recipe of Table 8. Comparative Formulation 11 comprises a metal drier to allow curing of the double bonds of the alkyd moieties. No metal drier is added to Formulation 10 as no double bonds of the alkyd type are present in Dispersion 3b.

TABLE 8

Wood stain formulation for Dispersion performance evaluation

|  | Comp. Formulation 11 | Formulation 10 |
|---|---|---|
| BEISPIEL 3 (45% solid content) | 61.3 g | — |
| Dispersion 3b (49% solid content) | — | 56.3 g |
| ADDITOL ® VXW 6206 (drier) | 0.46 g | — |
| ADDITOL ® VXW 6503 (substrate wetting agent) | 0.40 g | 0.40 g |
| ADDITOL ® VXW 6386 N (defoamer) | 0.40 g | 0.40 g |
| ADDITOL ® VXW 6370 (fungicide) | 1.00 g | 1.00 g |
| ADDITOL ® XL 297 (anti-skinning agent) | 0.40 g | 0.40 g |
| LUCONYL ® (red/yellow/brown = 40:39:1)(pigmentpaste) | 6.70 g | 6.70 g |
| De-ionized water [g] | amount set to 25% overall solid content | amount set to 25% overall solid content |

A set of US-standard pine-wood boards has been double coated by brushing with the formulations (24 hours of drying at 23° C., 55% r.h. after the first coat, 7 days of drying at 23° C., 55% r.h. after the second coat). For each coat an approximate amount of 50 g/m² of wood stain has been applied. After drying, the pine-wood boards have been sealed at the back and at the edges with a 2K-epoxy based sealant. After drying of the sealant for one week at 23° C., 55% r.h. the test specimen have been subjected to xenon weathering testing (including water spray) according to EN ISO 16474-2, method A, cycle 1, for a total testing time of 2000 hours.

After 2000 hours of xenon-testing had been completed, the test specimens have been optically analyzed. The optical comparison of both aged wood stain samples clearly showed that Comparative Formulation 11 (based on Beispiel 3) suffered from severe degradation due to hydrolytic and irradiation attack during testing. Severe color change and darkening of the test specimen was observed. Furthermore, cracking and peeling of the wood stain could be observed on the tested sample after 2000 hours of xenon testing with the naked human eye.

Formulation 10 (based on Dispersion 3b of the present invention) clearly performed significantly better after 2000 hours xenon-testing in comparison to Comparative Formulation 11. Formulation 10 did not show significant discoloration or color change. Furthermore, cracking or peeling of the wood stain was not observed.

Those observations in xenon aging (including water-spray) clearly prove the increased chemical stability and weathering resistance of the products according to the present invention over the prior art described in EP 0305795.

Similar results are expected for products described in the prior arts U.S. Pat. Nos. 4,073,758, 4,122,052, WO 92/14763 and US 2010/0261840 as in all those cases fatty acid moieties are also incorporated in the polymeric backbone or as side chain via ester bonds. In case of the present invention fatty acid moieties are integrated in the polymeric backbone of copolymer (A) by hydrolysis-stable covalent carbon-carbon bonds which leads to increased chemical and weathering resistance of the products based on the present invention.

Formulations 12-15 and Trim Paints 1 and 2

In addition to the blending experiments described in Table 7, a blend of Dispersion 1 b as described here above with a commercially available dispersion comprising 45 wt % of an oxidatively drying alkyd (RESYDROL® AY 586w/45WA) has been evaluated regarding its physical and chemical properties.

For means of comparison, a blend of a commercial high-Tg acrylic dispersion (UCECRYL® B 3025 resin) with the same reference alkyd resin has also been included in this evaluation. Furthermore, the obtained results have been compared to the properties of the pure reference alkyd with and without siccativation using the metal based drier ADDITOL® VXW 6206.

The respective formulation recipes summarized in Table 9.

|  | Formul. 12 | Formul. 13R | Formul. 14R | Formul. 15R |
|---|---|---|---|---|
| Dispersion 1b [g] | 7.8 | — | — | — |
| UCECRYL ® B 3025 [g] | — | 7.8 | — | — |
| RESYDROL ® AY 586w/45WA [g] | 48.9 | 48.9 | 56.7 | 56.3 |
| ADDITOL ® VXW 6206 [g] | — | — | — | 0.4 |
| Deionized water | amount is set to 40% overall solid content | | | |

For the evaluation of the physical and chemical performances of those formulations, they have been applied on a glass-plate with a wet-film thickness of 150 µm using a standardized coating bar. Then the resin film was allowed to dry for 24 hours at 23° C. and 55% rh (relative humidity) prior to evaluation. The evaluation of the tack-free time has been carried out during the drying procedure. The performance testing results of Formulations 12 to 15R are summarized in Table 10. Tack-free time and water resistance are evaluated according to the procedures previously outlined in the text. Drying stage: The evaluation of the drying stage is carried out on the resin film after 24 hours of drying at 23° C. and 55% rh according to DIN EN ISO 9117-5.

TABLE 10

Performance evaluation results of Formulation 12 to 15R

| Testing Procedure | Formul. 12 | Formul. 13R | Formul. 14R | Form. 15R |
|---|---|---|---|---|
| Tack-free time (VLN 161) [h; min] 150 μm wet film thickness on glass | 2 h | >24 h | >24 h | 4 h |
| Drying stage (DIN EN ISO 9117-5) after 24 h drying 150 μm wet film thickn. on glass | 2 | — | — | 2 |
| Water resistance [h; min] after 24 h drying 150 μm wet film thickn. on glass | 2 h | — | — | 2 h |

Formulation 14R based on the pure alkyd resin does not show significant drying after 24 hours drying at 23° C., 55% r.h. The tack-free time for the pure alkyd is found to be >24 hours and for this reason further testing has not been carried out after 24 hours of drying at ambient temperature. The same results are found for Formulation 13R, based on a blend of the alkyd resin with a commercial high-Tg acrylic dispersion. This result confirms that in case of Formulation 13R blending with the acrylic dispersion does not show significant effects on the evaluated properties.

The use of cobalt-based driers (like ADDITOL® VXW 6206) in Formulation 15R drastically improves the drying and performance characteristics of the alkyd as known to those skilled in the art.

It has surprisingly been found that blending of Dispersion 1 b and the alkyd under consideration (Formulation 12) drastically improves the drying and performance characteristics of the alkyd. Although Formulation 12 does not contain any metal-based driers (siccative), it shows a drastic reduction in the tack-free time even in comparison to the siccativated alkyd (Formulation 15R) containing a cobalt-based drier.

The drying stage according to DIN EN ISO 9117-5 after 24 hours of drying at ambient conditions is also perfectly comparable for Formulations 12 and 15R, respectively.

In regards of water resistance after 24 hours of drying at ambient temperature both Formulations 12 and 15R perform very well, also yielding comparable results. After 2 hours of water exposure, slight swelling of the film is observed for both cases.

For evaluation of the chemical resistance of Formulations 12 and 15R, a set of standard maple-wood boards has been double coated by brushing with the formulations (24 hours of drying at 23° C., 55% rh after the first coat, 20 days of drying at 23° C., 55% rh after the second coat). For each coat an approximate amount of 50 g/m² of the respective formulation has been applied. After drying, the maple-wood boards have been tested according to DIN 68861-1B with the substances mentioned in Table 11. Evaluation of the testing results has been carried out according to DIN EN 12720.

TABLE 11

Chemical resistance testing of Formulation 12 and 15R according to DIN 68861-1B and evaluation of results according to DIN EN 12720

| Chemical substance | Evaluation result according to DIN EN 12720 | |
|---|---|---|
| [number; time of exposure DIN 68861-1B] | Formulation 12 | Formulation 15R |
| Ethanol [4; 1 h] | 5 | 5 |
| Cleaning agent [23; 1 h] | 5 | 5 |
| Aqueous ammonia [3; 2 min] | 3 | 3 |
| Acetone [14; 10 s] | 3 | 3 |
| Water [12; 16 h] | 5 | 5 |
| Coffee [8; 16 h] | 5 | 5 |
| Red wine [5; 16 h] | 5 | 5 |

The results of the chemical resistance testing summarized in Table 11 clearly show that Formulation 12 and Formulation 15R are perfectly comparable regarding their chemical resistance. The results outlined above are to be considered a clear advantage of the present invention over the prior art. Blending of aqueous dispersion compositions according to the invention with alkyds may eliminate the necessity to use heavy metal based siccatives (e.g. cobalt based driers) in combination with alkyds in order to obtain the desired performance. As heavy metal based driers are known to be very expensive, potentially toxic as well as significantly harmful to the environment, blending of aqueous dispersion compositions according to the invention with alkyds is a clear advantage over the prior art. Performance levels of those blends are found to be identical to the performance of siccativated alkyds even at considerably low levels of content with regards to the aqueous dispersion compositions according to the invention.

An additional experiment has been carried out using pigmented trim-paint formulations of the blend comprising Dispersion 1 b and the dispersion of the alkyd resin RESYDROL® AY 586w/45WA (without siccativation, Trim paint 2) and the pure, siccativated alkyd (Trim paint 1). The formulation recipe of those trim paints is summarized in Table 12.

TABLE 12

Formulation recipe for white pigmented trim paints:

| | Trim paint 1R | Trim paint 2 |
|---|---|---|
| Alkyd resin RESYDROL® AY 586w/45WA [g] | 56.30 g | 48.90 g |
| ADDITOL® VXW 6206 [g] (metal-based drier) | 0.40 g | — |
| Dispersion 1b [g] | — | 7.80 g |
| ADDITOL® VXW 6208 [g] (dispersing agent) | 1.08 g | 1.08 g |
| Propylen glycol [g] (coalescing agent) | 0.51 g | 0.51 g |
| ADDITOL® VXW 4973 [g] (defoamer) | 0.57 g | 0.57 g |
| ADDITOL® VXW 6214 [g] (substrate wetting and leveling additive) | 0.24 g | 0.24 g |
| KRONOS® 2310 [g] (TiO₂ pigment) | 20.82 g | 20.82 g |
| TAFIGEL® PUR 80 [g] (associative PU thickener) | 1.62 g | 1.62 g |
| Deionized water | amount is set to 40% overall solid content | |

For evaluation of physical and chemical performances the Trim paints 1R and 2 are coated on a glass-plate with a wet-film thickness of 150 μm using a standardized coating bar. Then the resin film is allowed to dry for 24 hours at 23°

C. and 55% rh (relative humidity) prior to evaluation. The evaluation of the tack-free time has been carried out during the drying procedure.

The testing results of Trim paint 1R and Trim paint 2 are summarized in Table 13:

TABLE 13

Summary of testing results for trim-paints:

| Testing Procedure | Trim paint 1R | Trim paint 2 |
|---|---|---|
| Tack-free time (VLN 161) [h; min] 150 μm wet film thickness on glass | 4 h | 2 h |
| Drying stage (DIN EN ISO 9117-5) after 24 h drying - 150 μm wet film thickness on glass | 3 | 3 |
| Drying stage (DIN EN ISO 9117-5) after one week of drying - 150 μm wet film thickness on glass | 4 | 4 |
| Water resistance [h; min] after 24 h drying 150 μm wet film thickness on glass | 2 h | 2 h |
| Gloss level (DIN EN ISO 2813; <60°)[GU] after 24 h drying - 150 μm wet film thickness on glass | 88 | 85 |

These results show that the findings outlined above for unpigmented Formulations 12 and 15R (Table 10) have been also verified for pigmented trim paints as shown in Table 13. Trim paint 2 shows a reduced tack-free time, even without the use of any additional siccatives, in comparison to Trim paint 1R based on the pure, siccativated alkyd resin. Drying stages as well as water resistance are perfectly comparable for both pigmented trim paints and are also very similar to the results obtained with the unpigmented binders.

It has surprisingly been found that blending of Dispersion 1 b with the alkyd (Trim paint 2) does not significantly reduce the gloss level compared to the pure, siccativated alkyd (Trim paint 1R). It is generally known by those skilled in the art that blending of alkyds and acrylic resins may lead to a significant reduction in gloss due to certain incompatibilities of the resins under consideration. The similarity in gloss levels of Trim paint 1R and Trim paint 2 clearly outlines the benefits of the present invention over prior arts in this field.

Furthermore, the analysis results of pigmented trim paints further support the fact that metal based driers may be substituted by aqueous dispersions according to the invention in the final application without noticeable difference in the performance of the final products.

The invention claimed is:

1. An aqueous dispersion obtained by a process comprising the steps of:
   (a) preparing an acidic copolymer (A) having an acid value when contacted with water of at least 140 mg KOH/g by radical copolymerization of monomers comprising:
       (a1) at least one unsaturated fatty acid,
       (a2) at least one ethylenically unsaturated monomer containing at least one acid group or group capable of forming an acid group when contacted with water, and
       (a3) at least one other ethylenically unsaturated monomer different from (a1) and (a2), wherein the at least one unsaturated fatty acid (a1) is incorporated in the polymeric backbone of the acid copolymer (A) via carbon-carbon bonds,
   (b) neutralizing totally or partially the acid groups of copolymer (A) and dissolving it in water to form a totally or partially neutralized copolymer (A), and
   (c) copolymerizing in the solution obtained at step (b) at least one monomer mixture different from the monomer mixture of step (a) to form a copolymer (B).

2. The aqueous dispersion according to claim 1, wherein copolymer (A) is obtained from:
   5 to 50 wt % of unsaturated fatty acid (a1),
   5 to 90 wt % of ethylenically unsaturated monomer (a2),
   5 to 80 wt % of ethylenically unsaturated monomer (a3),
   based on the sum of (a1), (a2) and (a3).

3. The aqueous dispersion according to claim 1, wherein the at least one unsaturated fatty acid (a1) is selected from the group consisting of soybean oil fatty acids, linseed oil fatty acids, tall oil fatty acids and mixtures thereof.

4. The aqueous dispersion according to claim 1, wherein the at least one ethylenically unsaturated monomer (a2) is selected from the group consisting of (meth)acrylic acid, crotonic acid and mixtures thereof.

5. The aqueous dispersion according to claim 1, wherein at least one ethylenically unsaturated monomer (a3) used in step (a) has a glass transition temperature of its homopolymerisate of higher than 50° C.

6. The aqueous dispersion according to claim 1, wherein the at least one ethylenically unsaturated monomer (a3) used in step (a) is selected from the group consisting of styrene, alpha-methylstyrene, (meth)acrylamide, diacetone (meth)acrylamide, isobornyl (meth)acrylate, methyl methacrylate, and mixtures thereof.

7. The aqueous dispersion according to claim 1, wherein the totally or partially neutralized copolymer (A) has a degree of neutralization of at least 30% based on the total number of acid groups present in copolymer (A) when contacted with water and/or wherein the copolymer (A) is neutralized with at least one neutralizing agent selected from the group consisting of ammonia, amines and inorganic hydroxides.

8. The aqueous dispersion according to claim 1, wherein the copolymer (B) is obtained from monomers selected from the group consisting of styrene, vinyltoluene, alpha-methyl styrene, ethyl styrene, methyl (meth)acrylate, ethyl (meth)acrylate, propyl (meth)acrylate, butyl (meth)acrylate, pentyl (meth)acrylate, hexyl (meth)acrylate, heptyl (meth)acrylate, octyl (meth)acrylate, hydroxymethyl (meth)acrylate, hydroxyethyl (meth)acrylate, hydroxypropyl (meth)acrylate, hydroxybutyl (meth)acrylate, glycidyl (meth)acrylate, diacetone (meth)acrylamide, acetoacetoxyethyl(meth)acrylate, ureido(meth)acrylate and mixtures thereof.

9. The aqueous dispersion according to claim 1, wherein the copolymer (B) has at least two glass transition temperatures.

10. The aqueous dispersion according to claim 1 comprising:
    from 10 wt % to 40 wt % of copolymer (A),
    from 60 wt % to 90 wt % of copolymer (B),
    based on the sum of (A) and (B).

11. The aqueous dispersion according to claim 1 subject to crosslinking reactions due to the presence of binding sites present in copolymer (A) and/or copolymer (B) and in external compounds.

12. A process for the preparation of the aqueous dispersion according to claim 1, the process comprising the steps of:

(a) preparing an acidic copolymer (A) having an acid value when contacted with water of at least 140 mg KOH/g by radical copolymerization of monomers comprising:
(a1) at least one unsaturated fatty acid,
(a2) at least one ethylenically unsaturated monomer containing at least one acid group or group capable of forming an acid group when contacted with water, and
(a3) at least one other ethylenically unsaturated monomer different from (a1) and (a2), wherein the at least one unsaturated fatty acid (a1) is incorporated in the polymeric backbone of the acid copolymer (A) via carbon-carbon bonds,
(b) neutralizing totally or partially the acid groups of copolymer (A) and dissolving it in water to form a totally or partially neutralized copolymer (A), and
(c) copolymerizing in the solution obtained at step (b) at least one monomer mixture different from the monomer mixture of step (a) to form a copolymer (B).

13. A blend comprising the aqueous dispersion according to claim 1 and at least one further binder composition.

14. The blend according to claim 13, wherein the at least one further binder composition is an alkyd resin or a polyurethane dispersion.

15. The blend according to claim 13 wherein the at least one further binder comprises an oxidatively drying alkyd resin and wherein the amount of said alkyd resin is from 60 to 95 wt % based on the total amount of copolymer (A), copolymer (B) and said alkyd resin.

16. The blend according to claim 15 wherein the alkyd resin is selected from the group consisting of acrylic modified alkyd resins, urethane modified alkyd resins and alkyd-polyurethanes hydrids comprising moieties from acrylic modified alkyd resins.

17. The blend according to claim 15 containing less than 1 wt % of siccative.

18. A process for preparing a coated substrate or article, comprising a step of coating at least part of a surface of the substrate or article with the aqueous dispersion according to claim 11.

19. A process for preparing a coated substrate or article, comprising a step of coating at least part of a surface of the substrate or article with the blend according to claim 13.

* * * * *